United States Patent [19]

Matsuzaki et al.

[11] Patent Number: 5,281,474
[45] Date of Patent: Jan. 25, 1994

[54] HEAT-SENSITIVE ADHESIVE SHEET AND INFORMATION RECORDED MATERIAL USING THE SAME

[75] Inventors: Morio Matsuzaki, Higashimatsuyama; Nobuhiro Hatoh, Higashikurume; Hisashi Mino, Higashimatsuyama, all of Japan

[73] Assignee: Sanyo-Kokusaku Pulp Co., Ltd., Tokyo, Japan

[21] Appl. No.: 759,341

[22] Filed: Sep. 13, 1991

[30] Foreign Application Priority Data

Sep. 14, 1990 [JP] Japan .................................. 2-245381

[51] Int. Cl.⁵ ...................... B32B 23/08; B32B 27/10; B32B 7/12; B42D 15/02
[52] U.S. Cl. .................................... 428/349; 428/347; 428/511; 428/537.5; 428/915; 428/916; 283/72; 283/94; 283/100; 283/101; 283/107; 283/109; 283/110; 283/111
[58] Field of Search ............... 428/915, 916, 349, 347, 428/511, 537.5; 283/101, 100, 94, 72, 109, 110, 111, 107

[56] References Cited

U.S. PATENT DOCUMENTS

| | | | |
|---|---|---|---|
| 4,004,058 | 1/1977 | Buros et al. | 283/107 X |
| 4,343,851 | 8/1982 | Sheptak | 428/916 X |
| 4,381,329 | 4/1983 | Dallmann et al. | 428/916 X |
| 4,479,995 | 10/1984 | Suzuki et al. | 283/94 X |
| 4,497,872 | 2/1985 | Hoppe et al. | 283/110 X |
| 4,624,875 | 11/1986 | Watanabe et al. | 428/202 X |
| 4,742,954 | 5/1988 | Shishido | 283/100 X |
| 4,885,198 | 12/1989 | Kimura | 283/101 X |
| 5,020,830 | 6/1991 | Shishido | 283/111 X |

FOREIGN PATENT DOCUMENTS 2112541 1/1984 United Kingdom ............... 428/916

OTHER PUBLICATIONS

English translation of Jitsuyo Kokai No. 02-25546.

*Primary Examiner*—Daniel Zirker
*Attorney, Agent, or Firm*—Millen, White, Zelano & Branigan

[57] ABSTRACT

A heat-sensitive adhesive sheet for bonding a pair of information-recorded faces, belonging to the same sheet or two different sheets of recording material, together by application of heat thereto, which comprises three or more layers, including a support and a synthetic resin layer coated on either side of the support, having a peeling resistance ranging from 10 to 150 g/50 mm between the support and each synthetic resin layer in the T-peel test performed at a peeling speed of 300 mm/min. in the atmosphere of 20° C. and 65% RH, and a peeling resistance greater than 300 g/50 mm, measured under the same conditions as described above, between each synthetic resin layer and the information-recorded face when heated in a condition wherein the adhesive sheet is sandwiched in between a pair of information-recorded faces of the recording material, and an information-recorded material, preferably of postcard size which is made by inserting the foregoing heat-sensitive adhesive sheet between each pair of information-recorded faces belonging to one sheet or two or more sheets of recording material, wherein at least two information-recorded faces are present, and then by heating them at a temperature of 100° C. or lower to unite them together through heat-sensitive adhesion.

19 Claims, 3 Drawing Sheets

HEAT-SENSITIVE ADHESIVE SHEET AND INFORMATION RECORDED MATERIAL USING THE SAME

FIELD OF THE INVENTION

This invention relates to heat-sensitive adhesive sheet which enable one pair of information-recorded faces of one or two sheets of recording material to adhere to each other with the capability of peeling apart from each other when needed, and information-recorded materials utilizing said heat-sensitive adhesive sheets. In particular, it is concerned with a heat-sensitive adhesive sheet and an information-recorded material utilizing said adhesive sheet(s) which can be used for communicating more information than conventional postcards.

BACKGROUND OF THE INVENTION

In recent years, the occasion of mailing various kinds of documents on privacy of individuals, e.g., bills, notices for payment, receipts and notices for expiration which relate, e.g., to taxes, annuities, bonds, deposits and savings, credits, telegram and telephone charges, gas charge, water charge, electricity charge and so on, has markedly increased in number.

In mailing documents regarding privacy of each individual, sealed letters have so far been used from the standpoint of protecting privacy. However, mailing documents by sealed letter has the demerit of high price, compared with mailing documents by postcard.

Under these circumstances, various types of postcards capable of keeping the contents of a private message secret have been proposed in recent years.

As one of these proposals, a paper seal which is applied to the surface of a conventional postcard, on letters and figures are recorded, having a peel-apart possibility in order to temporarily veil the contents of the record. In the paper seal of this kind, a weak tackifier is used to form its adhesive face, so it is necessary to laminate a release paper for the protection of the weak tackifier layer. The use of a release paper is disadvantageous in that it causes an increase in cost, and is attended with a trouble of its disposal. Moreover, the paper seal-applied postcard has the defect that part of the letters and the like written on a postcard is stripped off and transferred to the weak tackifier layer in peeling the paper seal off the postcard; making hard to read. What is worse, the paper seal can be delaminated and relaminated so as not to leave traces of taking off the seal. Accordingly, the paper seal suffers another defect in that it is inferior for protecting against invasion of privacy.

As another material, there can be cited a label of the type which is a sheet lined with aluminum foil, applied to the letters-written side of a postcard in order to screen the message on the postcard, and designed so that breaking the seal becomes possible only when the sheet is cut open along perforations hemming round the postcard.

However, this label is expensive because it is a laminate having a composite structure and, what is worse, it is hard to break into pieces and to destroy by fire. Therefore, it suffers from a disposal problem.

In addition, the foregoing paper seal and label can be used only for veiling the recorded information. Accordingly, there has been no other means of mailing a great deal of information but to adopt the procedure of mailing in sealed covers which is higher in price.

In order to solve the above-described problems, we have previously proposed a transparent heat-sensitive adhesive sheet having adhesiveness on both sides (Jitsuyo Kokai No. 02-25546, wherein the term "Jitsuyo Kokai" used means an "unexamined published Japanese utility model application"). By the use of this sheet, the information-recorded faces of two sheets of postcard-size recording material can be bonded together in a condition whereby they can be peeled apart from each other when necessary.

However, it is essential for the process of manufacturing the foregoing transparent heat-sensitive adhesive sheet to involve a step of providing a thermoplastic resin layer on one side of a transparent plastic sheet in a releasable condition using a fusion extrusion technique. This step makes the manufacturing process complicated. In addition, not only the transparent plastic sheet but also the thermoplastic resin layer formed by fusion extrusion are hard to break into pieces by hand, so it is necessary to dispose of the information-recorded material using a special disposer such as a shredder from the standpoint of keeping the information secret. Disposal of this sort is inconvenient for private mails. Moreover, a transparent material is used as the support of said transparent adhesive sheet so that the information recorded on the face where the support remains can be read since the support is left on one of the information-recorded faces when the information-recorded material is torn open. This causes according to the quality of the recording material a serious situation that the secrecy of the information recorded inside the recording material is not preserved to a satisfactory extent.

On our further examination, it has been found that an entirely satisfactory result can be obtained by using a heat-sensitive adhesive sheet which has a support and synthetic resin layer provided on each side thereof in a condition that it can be peeled apart therefrom if needed, with the synthetic resin layer having an ability to adhere to an information-recorded face in a substantially unreleasable condition when heat is applied thereto, thus achieving this invention.

SUMMARY OF THE INVENTION

Therefore, a first object of this invention is to provide a heat-sensitive adhesive sheet which enables a pair of information-recorded faces of recording material(s) to bond together in a condition such that it can be peeled apart therefrom at the time it is due.

A second object of this invention is to provide a heat-sensitive adhesive sheet which can be produced with ease and at a low price, enables the recording materials, to which this adhesive sheet was once applied, to be recycled, and has an excellent capability for keeping recorded information secret.

A third object of this invention is to provide an information-recorded material which can be disposed of easily without using any special disposer, and has an excellent ability to protect the private information against disclosure.

A fourth object of this invention is to provide a post card which can communicate more information than conventional ones, and is superior in protecting against invasion of privacy.

The above-described objects of this invention are attained with a heat-sensitive adhesive sheet for bonding a pair of information-recorded faces of one or two sheets of recording material together by application of heat thereto, and with an information-recorded material using one or more of said heat-sensitive adhesive sheet; said heat-sensitive adhesive sheet comprising three of more constituent layers including a support and synthetic resin layers coated on both sides of the support, wherein the support and the synthetic resin meet the conditions that the peeling resistance between the support and each synthetic resin layer in the T-peel test (ASTM D1876-61T) ranges from 10 to 150 g/50 mm when measured at a peeling speed of 300 mm/min. in the atmosphere of 20° C. and 65% RH, and the peeling resistance between each synthetic resin layer and the information-recorded face in the T-peel test becomes greater than 300 g/50 mm, measured at a peeling speed of 300 mm/min in the atmosphere of 20° C. and 65% RH, when said adhesive sheet is sandwiched in between each pair of the information-recorded faces of the recording material(s) and heat is applied thereto.

In accordance with embodiments of this invention, the present adhesive sheet, in contrast to conventional transparent heat-sensitive adhesive sheets applied to information-recorded materials, enables its support to be separated from the information-recorded material(s) when the information-recorded faces bonded together through the adhesive sheet are peeled part from each other so that information recorded inside can be read. Consequently, it becomes feasible to use as the support an opaque material or a light absorbing material, which makes it impossible to look through the recorded information from the outside, that is to say, which results in heightening the concealing ability of the present adhesive sheet.

BRIEF DESCRIPTION OF DRAWINGS

FIG. 3 is an example of a recording material which can be made into the information-recorded material of this invention by being folded into the S-form.

FIG. 4 is another example of a recording material which can be made into the information-recorded material of this invention by being folded into the Z-form.

In the Figures, an adhesive sheet is denoted by 3, a support by 3a, a synthetic resin layer by 3b, a recording material by 5, and information-recorded faces by 5a and 5b.

DETAILED DESCRIPTION OF THE INVENTION

The heat-sensitive adhesive sheet of this invention (abbreviated as "the adhesive sheet", hereinafter) and the information-recorded materials using said adhesive sheet are described in detail on the basis of the figures. However, the invention should not be construed as being limited to such figures.

Figure 1:
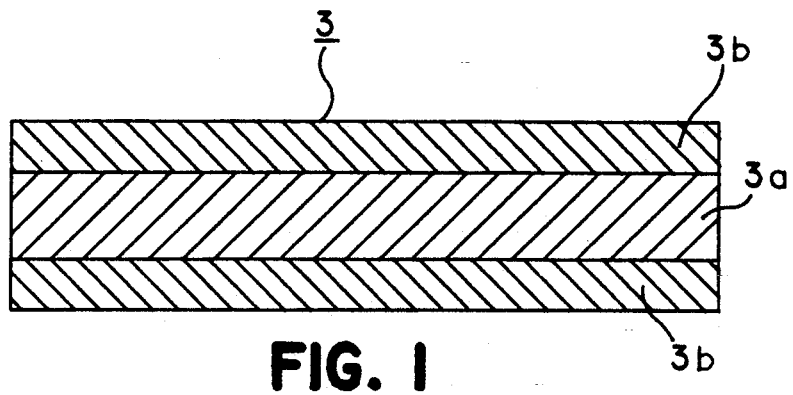
FIG. 1 is a cross-sectional view of the adhesive sheet of this invention.
Figure 2:
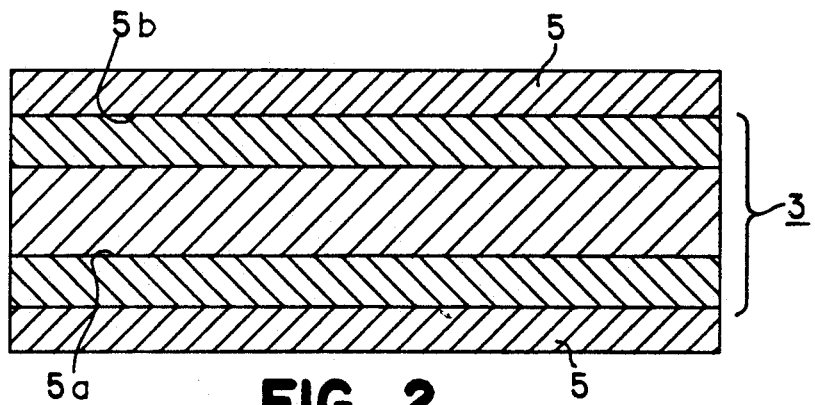
FIG. 2 is a cross-sectional view of the information-recorded material of this invention wherein the adhesive sheet of this invention is used.

A cross-sectional view of the adhesive sheet of this invention is shown in FIG. 1, and that of the information-recorded material of this invention in which the adhesive sheet of FIG. 1 is used is shown in FIG. 2.

In these figures, (3) stands for the adhesive sheet of this invention, (3a) stands for a colorless or colored, transparent or opaque support, and (3b) stands for a synthetic resin layer formed by coating a synthetic resin on either side of the support (3a).

The support (3a) can be chosen properly from among paper; transparent synthetic resin films which may be opacified by containing a lot of voids or white pigments therein, by providing a white coat on the film surface or by evaporating a metal into a thin layer on the film surface; composite materials made up of paper, such as impregnated paper (made by percolating a resin solution into paper layers and drying them to cake); and plastics, or other known materials. However, it is preferable to use an opaque support in order to make it impossible to look through the information recorded inside the recording material. Therefore, it is desirable in particular to color the above-cited paper or film sheets with a dye or pigment to impart a light-absorbing capability to them. Although such a dye or pigment can be chosen properly from known materials, those of black color are particularly preferred from the standpoint of ensuring the secrecy of the recorded information before opening. Dyes or pigments may each be used alone or as a mixture of two or more thereof, or dyes and pigments may be used together. These coloring agents can be coated on the support (3a), or incorporated into the support (3a) using known methods.

In using a synthetic resin film as the support (3a), an optimal one is selected from known synthetic resin films including polyethylene film, polypropylene film, polyester film, cellulose triacetate film, polycarbonate film, polyamide film, and so on.

In order to form the synthetic resin layer (3b), a synthetic resin having in the T-peel test a peeling resistance of 10–150 g/50 mm with respect to the support (3a), and a peeling resistance of 300 g/50 mm or more with respect to the information-recorded face when measured at the peeling speed of 300 mm/min in the atmosphere of 20° C. and 65% RH is used. Consequently, the application of the adhesive sheet(s) of this invention to an information-recorded material enables easy peeling of the support (3a) from the recorded material at the time of opening.

Synthetic resins used for the synthetic resin layer (3b) of this invention can be chosen properly from among known materials, including acryl resins, vinyl chloride/vinyl acetate copolymer resins, polyester resins, vinyl chloride/vinyl propionate copolymer resins, polyvinyl formal resins, polyvinyl butyral resins, polyolefin resins, and mixtures of two or more of the above-cited ones. In particular, those resins having a glass transition point of 25° C. or higher are preferred from the standpoints of facility in peeling apart from the support and their superiority in keeping quality (cf. Example 1 and Comparative Example 1). Among the synthetic resins of such a kind, polyolefin resin dispersions, especially those of ethylenic olefin copolymerized resins, low density polyethylenes, vinyl acetate-olefin copolymers, ionomer resin and so on, and mixtures of two or more of these resin dispersions, are favored over others. In particular, those having a Vicat softening temperature of 45° C. or higher are advantageous in that they can ensure further facility in peeling apart from the support and better keeping quality (cf. Example 2 and Comparative Example 2). As specific examples of resin mixtures which can be preferably used, mention may be made of compositions obtained by mixing one(s) selected from dispersions of ethylenic olefins copolymerized resins, low density polyethylenes, vinyl acetate-olefin copolymers or ionomer resins with self-emulsifying polyolefin resin(s) in a mixing ratio of from 95/5 to 5/95 on a resins basis. When these compositions are coated and dried, synthetic resin layers having a Vicat softening temperature of 45° C. or higher can be formed (cf. Example 3 and Comparative Example 3). The term "Vicat softening temperature" used herein is referred to as a temperature measured in accordance with ASTMD 1525-70, and has the same meaning as Vicat softening point. More specifically, it is represented by the temperature at which the stylus point of a gauge is penetrated below the surface of plastics at a depth of 1 mm when the gauge on which a load of 1 Kg is imposed is placed on the plastics surface, and heat is applied thereto.

A dry thickness of a synthetic resin coat is preferably 20 μm or less for facilitating destruction. In particular, a synthetic resin coat designed so as to have a dry thickness of about 10 μm or less is favored because it can be easily broken into pieces by hand.

In addition, an adhesive layer may be provided between the synthetic resin coat (3b) and the support (3a), if desired.

As described above, the adhesive sheet (3) of this invention is constituted by at least three layers, namely a support (3a) and synthetic resin coats (3b) provided on both sides of the support. Information-recorded materials using the adhesive sheet (3) of this invention are described in detail below.

An information-recorded material relating to this invention is referred to as one which is obtained by sandwiching the adhesive sheet (3) of this invention in between each pair of information-recorded faces (5a, 5b), whether present on the same sheet or different sheets of recording material, wherein at least two or more information-recorded faces must be present in all, and then by heating them to a temperature of 100° C. or below to unite them together.

A recording material (5) used in the information-recorded material of this invention can be chosen properly from known materials, including ordinary paper used for postcards, letter paper, and recording materials for computer use.

Figure 3:
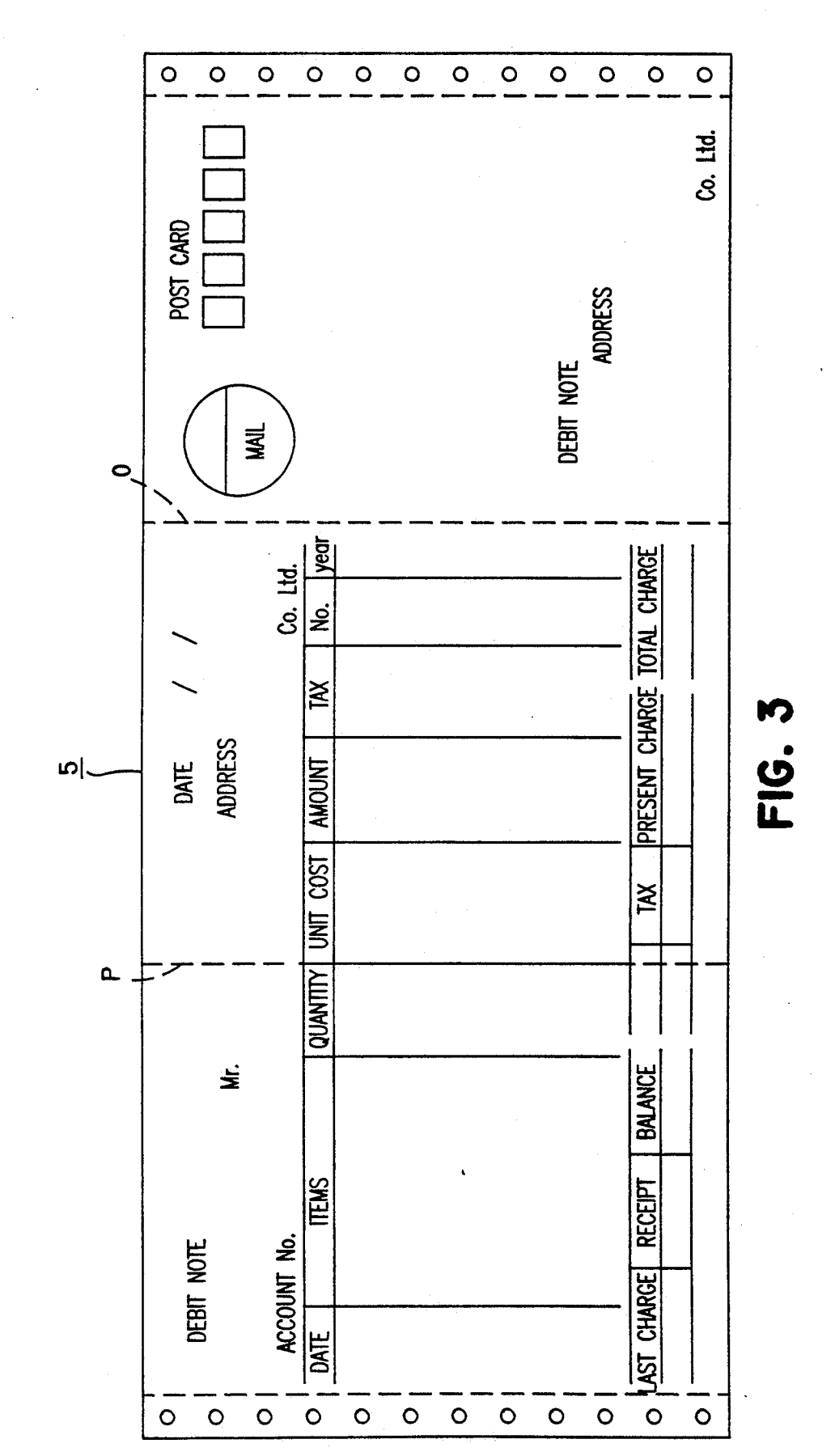
Figure 4:
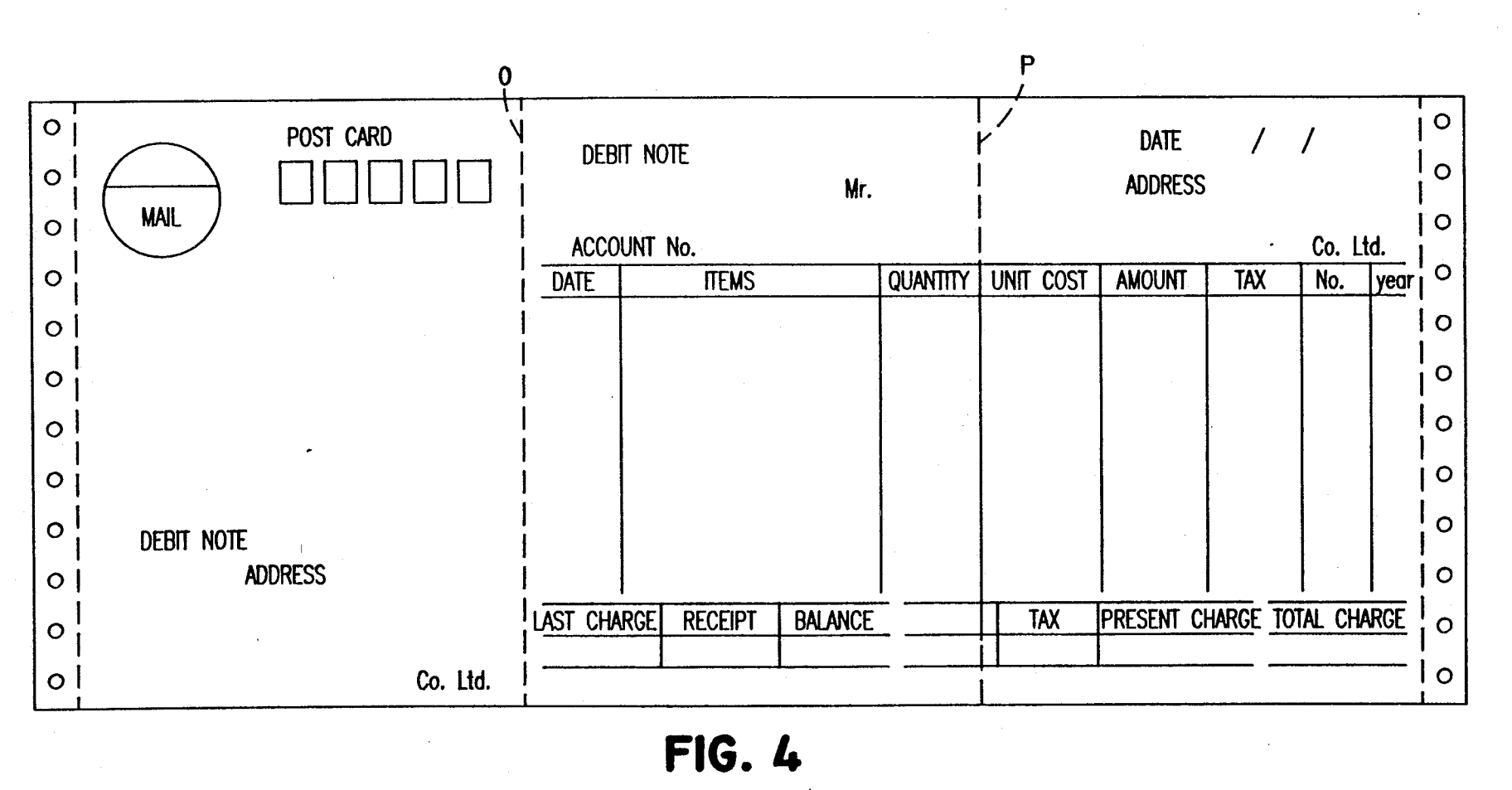

More specifically, the information-recorded material of this invention is a postcard-size material formed by sandwiching the adhesive sheet (3) of this invention in between every pair of information-recorded faces (arranged opposite to each other) of recording material(s) (5), and then by heating them at a temperature of 100° C. or below to unite them together. As shown in FIG. 2, for instance, two sheets of postal card-size recording material (5) are arranged so that their respective information-recorded faces (5a and 5b) oppose each other and therebetween is sandwiched in the foregoing adhesive sheet (3), which is followed by uniting them in one together through heat-sensitive adhesion. On the other hand, as shown in FIG. 3 and FIG. 4, a recording material (5) having an amount of information sufficient for three faces which has been recorded simultaneously on at least one side of one sheet of printing paper is folded in the S-form (FIG. 3) or in the Z-form (FIG. 4), and the adhesive sheet (3) is sandwiched in between each pair of opposite faces (5a and 5b), followed by uniting them (See FIG. 5). In the latter case, much more information can be incorporated in a postcard since it becomes feasible to have four information-recorded faces inside the postcard.

In the above description, a special case in application of the adhesive sheet of this invention, that is, application to a postcard, is taken up. However, the adhesive sheet of this invention can be used for various purposes as well as postcards. As an example of such purposes, mention may be made of an information-recorded material to be inserted into an envelope. More specifically, when the adhesive sheet (3) of this invention is sandwiched in between the opposite information-recorded faces (5a and 5b) of a twofold recording material (5) and subjected to heat-sensitive adhesion, the information recorded inside the recording material can be kept secret even if the sealed letter is opened so as to leave no traces of breaking the seal, and the contents of documents inserted in the envelope cannot be looked through from the outside. Therefore, the mailing in the above-described form is superior for protecting against invasion of privacy in comparison to the mailing in the form of a conventional sealed letter.

As described above in detail, the present adhesive sheet can be produced with ease at a low price since the manufacturing process consists of fewer steps, compared with conventional transparent heat-sensitive adhesive sheets.

In addition, a postcard-size recording material utilizing the adhesive sheet(s) of this invention can keep the secrecy of its contents, and can communicate more than twice the quantity of information by the same postage as that of a conventional postcard. Further, the information-recorded material can be easily torn to pieces with ease and thrown away at the time of disuse, so the disposal thereof can be done with ease even at home. Therefore, the information-recorded material to which the adhesive sheet(s) of this invention is(are) applied is useful in particular as the means of communicating private information which requires secrecy. Furthermore, it can be recycled since the support of the adhesive sheet can be disposed of separately.

EXAMPLE

Now, the present invention will be illustrated in more detail by reference to the following examples. However, the invention should not be construed as being limited to these examples.

EXAMPLE 1

On each side of a 16 μm-thick polyester film support (3a), a transparent polyvinyl butyral resin having a glass transition point of 57° C. and capable of adhering to an information-recorded material when heated to 80° C. was coated to a dry thickness of 10 μm to prepare an adhesive sheet relating to this invention.

Then, a recording material intended for postcard use, which had a basis weight of 80 g/m² on which information from a computer was recorded in advance, was folded, as shown in FIG. 3, along the dashed line P so that the information-recorded face might be brought into face-to-face contact, and further folded back along the dashed line O.

Figure 5:
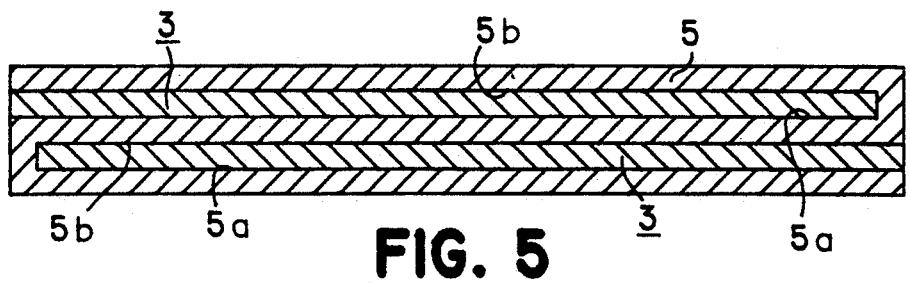
FIG. 5 is a cross-sectional view of the information-recorded material using the recording material illustrated in FIG. 4.

The previously prepared adhesive sheet was sandwiched in between each pair of the opposite faces of the folded material, and passed between a pair of hot rolls having a surface temperature controlled to 100°–110° C. to effect heat-sensitive adhesion, followed by thorough cooling (See FIG. 5).

The thus prepared postcard was able to be delaminated with ease at the interface between the support (3a) and each coat of the synthetic resin (3b). In addition, the printed faces suffered no damage and the recorded information was able to be read satisfactorily.

Additionally, this information-recorded material was examined for peeling resistance according to the T-peel test performed at a peeling speed of 300 mm/min under the atmosphere of 20° C. and 65% RH. As the result thereof, it had the peeling resistance of 40 g/50 mm between the support (3a) and each synthetic resin coat (3b), and that of 300 g/50 mm between the information-recorded material and the adhesive sheet of this invention.

The whole weight of the postcard prepared in the above-described manner was confirmed to meet the standard in the postal regulations, that is, to be usable as a postal card.

COMPARATIVE EXAMPLE 1

An adhesive sheet was prepared in the same manner as in Example 1, except that an acryl resin having a glass transition temperature of 20° C. was coated as the synthetic resin coat (3b). The obtained sheet was similarly applied to the information-recorded material.

The peeling resistance of the adhesive sheet applied material was examined by the T-peel test under the same condition as in Example 1. The result was that the peeling resistance, though the same as in Example 1 (that is, 300 g/50 mm) between the information-recorded material and the adhesive sheet, was 200 g/50 mm between the support and the synthetic resin coat (3b), resulting in peel-apart curling. Accordingly, it was difficult to read the printed letters and figures.

EXAMPLE 2

On each side of a 16 μm-thick polyester film support (3a), into which a light absorbing black pigment was previously kneaded, a transparent ethylenic olefins-copolymerized resin having a Vicat softening temperature of 54° C. and capable of adhering to an information-recorded material when heated to 90° C. was coated to a dry thickness of 10 μm to prepare an adhesive sheet relating to this invention.

Then, the thus prepared adhesive sheet was sandwiched in between each pair of opposed faces of an information-recorded material in the same way as in Example 1, and passed between a pair of hot rolls having a surface temperature controlled to 100°-110° C. to effect heat-sensitive adhesion, followed by thorough cooling (See FIG. 5).

The thus prepared postcard was able to be delaminated with ease at the interface between the support (3a) and each coat of the synthetic resin (3b). In addition, the printed faces suffered no damage and the recorded information was able to be read satisfactorily. Additionally, this information-recorded material was examined for peeling resistance according to the T-peel test performed under the same condition as in Example 1. As the result thereof, it had the peeling resistance of 60 g/50 mm between the support (3a) and each synthetic resin coat (3b), and that of 300 g/50 mm or more between the information-recorded material and the adhesive sheet of this invention.

The whole weight of the postcard prepared in the above-described manner was confirmed to meet the standard in the postal regulations, that is, to be usable as a postal card.

COMPARATIVE EXAMPLE 2

An adhesive sheet was prepared in the same manner as in Example 2, except that a vinyl acetate-olefin copolymerized resin having a Vicat softening temperature of 42° C. was coated as the synthetic resin coat (3b). The obtained sheet was similarly applied to information-recorded material.

The peeling resistance of the adhesive sheet-applied material was examined by the T-peel test under the same condition as in Example 2. The result was that the peeling resistance, though similar to that in Example 2 (that is, 300 g/50 mm) between the information-recorded material and the adhesive sheet, was 200 g/50 mm between the support and the synethetic resin coat (3b), thereby causing peel-apart curling. Consequently, it was difficult to read the printed letters and figures. Further, the thus curled-up material was kept for 30 days in the atmosphere of 30° C. and 65% RH. Thereupon, a blocking phenomenon was observed. This result demonstrates the inferiority of the comparative sheet in keeping facility.

EXAMPLE 3

On each side of a 16 μm-thick polyester film support (3a), into which a light-absorbing black pigment was previously kneaded, a resinous composition capable of adhering to an information-recorded material when heated to 80° C., which was a mixture of a dispersion of an ethylenic olefins-copolymerized resin having a Vicat softening temperature of 54° C. and a self-emulsified polyolefin resin having a Vicat softening temperature of 83° C. with a mixing ratio of 60/40 on a solids basis, was coated to a dry thickness of 10 μm to prepare an adhesive sheet relating to this invention.

Then, a recording material intended for postcard use, which had a basis weight of 80 g/m$^2$ on which information from a computer was recorded in advance, was folded, as shown in FIG. 3, along the dashed line P so that the information-recorded face might be brought into face-to-face contact, and further folded back along the dashed line O.

The adhesive sheet prepared in advance was sandwiched in between each pair of the opposite faces of the folded material, and passed between a pair of hot rolls having a surface temperature controlled to 100°-110° C. to effect heat-sensitive adhesion, followed by thorough cooling (See FIG. 5).

The thus prepared postcard was able to be delaminated with ease at the interface between the support (3a) and each coat of the synthetic resin (3b). In addition, the printed faces suffered no damage and the recorded information was able to be read satisfactorily. Additionally, this information-recorded material was examined for peeling resistance according to the T-peel test performed at a peeling speed of 300 mm/min under the atmosphere of 20° C. and 65% RH. As the result thereof, it had the peeling resistance of 90 g/50 mm between the support (3a) and each synthetic resin coat (3b), and that of 300 g/50 mm between the information-recorded material and the adhesive sheet of this invention.

The whole weight of the postcard prepared in the above-described manner was confirmed to meet the standard in the postal regulations, that is, to be usable as a postal card.

COMPARATIVE EXAMPLE 3

An adhesive sheet was prepared in the same manner as in Example 3, except that a dispersion of a vinyl acetate-olefin copolymerized resin having a Vicat softening temperature of 42° C. was coated as the synthetic resin coat (3b). The obtained sheet was similarly applied to the information-recorded material.

The peeling resistance of the adhesive sheet-applied material was examined by the T-peel test under the same condition as in Example 3. The result was that the peeling resistance, though similar to that in Example 3 (that is, not less than 300 g/50 mm) between the information-recorded material and the adhesive sheet, was 200 g/50 mm between the support and the synthetic resin coat (3b), thereby causing peel-apart curling. Consequently, it was difficult to read the printed letters and figures. Additionally, a blocking phenomenon was observed by keeping the thus curled-up material for 30 days in the atmosphere of 30° C. and 65% RH, which demonstrated the inferiority of the comparative sheet in keeping facility.

Thus, the foregoing examples of this invention and those for comparison have proved that desirable characteristics are attained when the synthetic resin coat (3b) has a glass transition point of 25° C. or higher, particularly a Vicat softening temperature of 45° C. or higher.

What is claimed is:

1. A heat-sensitive adhesive sheet for bonding a pair of information-recorded faces of one or two sheets of recording material together by application of heat thereto, said adhesive sheet comprising:
    an opaque support layer having two sides, a synthetic resin layer coated on one side of said opaque support layer, and another synthetic resin layer coated on the other side of said opaque support layer, each of said synthetic resin layers having a peeling resistance of 10-150 g/50 mm between said opaque support layer and each of said synthetic resin layers in a T-peel test performed at a peeling speed of 300 mm/min. in an atmosphere of 20° C. and 65% RH,
    said synthetic resin layers capable of exhibiting peeling resistance greater than 300 g/50 mm, measured under the same conditions as said T-peel test, between each of said synthetic resin layers and an information-recorded face of a recording material, and
    each of said synthetic resin layers having a glass transition temperature of at least 25° C. and a Vicat softening temperature of at least 45° C.

2. A heat-sensitive adhesive sheet of claim 1, wherein said support layer is a light-absorbing sheet containing a dye, a pigment, or both.

3. A heat-sensitive adhesive sheet of claim 1, wherein each of said synthetic resin layers has a thickness of at most 20 µm.

4. A heat-sensitive adhesive sheet of claim 1, wherein each of said synthetic resin layers contains a resin selected from the group consisting of acryl resins, vinyl chloride-vinyl acetate copolymerized resins, polyester resins, vinyl chloride-vinyl propionate copolymerized resins, polyvinyl formal resins, polyvinyl butyral resins, polyolefin resins, and mixtures thereof.

5. A heat-sensitive adhesive sheet of claim 1, wherein each of said synthetic resin layers contains a dispersion of an ethylenic olefin-copolymerized resin, a low density polyolefin, a vinyl acetate-olefin copolymerized resin, an ionomer resin, or mixtures thereof.

6. A heat-sensitive adhesive sheet of claim 1, wherein each of said synthetic resin layers is a mixed resin layer formed by coating and drying a composition prepared by mixing a resin dispersion selected from the group consisting of olefin-copolymerized resin dispersions, low density polyolefin dispersions, and ionomer resin dispersions, with an emulsified polyolefin resin in a mixing ratio of 95:5–5:95 on a solids basis.

7. A heat-sensitive adhesive sheet of claim 1, wherein said adhesive sheet consists of said support and said synthetic resin layers.

8. A heat-sensitive adhesive sheet of claim 1, wherein said support layer is a plastic laminated paper sheet.

9. A heat-sensitive adhesive sheet of claim 1, wherein said support layer is a synthetic resin film selected from the group consisting of polyethylene film, polypropylene film, polyester film, and polyamide film.

10. A heat-sensitive adhesive sheet of claim 3, wherein each of said synthetic resin layers has a thickness of at most about 10 microns.

11. A heat-sensitive adhesive sheet according to claim 1, wherein said synthetic resin layers are both made of the same material.

12. A heat-sensitive adhesive sheet of claim 6, wherein the resin dispersion is vinyl acetate-olefin copolymerized resin dispersion.

13. A heat-sensitive adhesive sheet of claim 1, wherein said support layer is a cellulose triacetate film.

14. A heat-sensitive adhesive sheet of claims 1, wherein said support layer is a polycarbonate film.

15. An information-recorded material comprising:
    at least one heat-sensitive adhesive sheet of claim 1, which is inserted between a pair of information-recorded faces of at least one sheet of recording material,
    wherein said adhesive sheet and pair of information-recorded faces are bonded together by heat-sensitive adhesion at a temperature of not more than 100° C.

16. An information-recorded material according to claim 15, wherein each of said synthetic resin layers has a thickness of at most 20 microns.

17. An information-recorded material according to claim 15, wherein said synthetic resin layers are both made of the same material.

18. An information-recorded material according to claim 15, wherein a single sheet of recorded material is folded to provide two pairs of opposed information-recorded faces and said information-recorded material contains two of said adhesive sheets, each of said adhesive sheets being inserted between a pair of opposed information-recorded faces.

19. An information-recorded material of claim 15, wherein said material is a postcard.

* * * * *